(12) United States Patent
Löbel et al.

(10) Patent No.: US 7,608,236 B2
(45) Date of Patent: Oct. 27, 2009

(54) METHOD FOR PRODUCING HYDROXYLAMMONIUM SALTS

(75) Inventors: Wolfgang Löbel, Halle (DE); Thomas Strecker, Thalheim (DE); Joachim Seidler, Halle (DE)

(73) Assignee: Domo Caproleuna GmbH (DE)

( * ) Notice: Subject to any disclaimer, the term of this patent is extended or adjusted under 35 U.S.C. 154(b) by 0 days.

(21) Appl. No.: 10/562,984

(22) PCT Filed: Jul. 28, 2004

(86) PCT No.: PCT/DE2004/001726

§ 371 (c)(1), (2), (4) Date: Apr. 2, 2007

(87) PCT Pub. No.: WO2005/012169

PCT Pub. Date: Feb. 10, 2005

(65) Prior Publication Data

US 2007/0172407 A1 Jul. 26, 2007

(30) Foreign Application Priority Data

Aug. 1, 2003 (DE) ................................ 103 36 054

(51) Int. Cl.
*C01B 21/20* (2006.01)
*B01F 13/02* (2006.01)

(52) U.S. Cl. .................. 423/387; 366/104; 423/388

(58) Field of Classification Search ................ 423/387, 423/388; 366/104
See application file for complete search history.

(56) References Cited

U.S. PATENT DOCUMENTS

| 2,827,363 | A | * | 3/1958 | Marhofer ................ 423/387 |
| 3,133,790 | A | * | 5/1964 | Jockers ................ 423/388 |
| 3,855,404 | A | | 12/1974 | Rotaru |
| 5,198,156 | A | * | 3/1993 | Middleton et al. ........... 261/87 |

FOREIGN PATENT DOCUMENTS

| DE | 3130305 | 2/1983 |
| EP | 234768 | 9/1987 |

* cited by examiner

*Primary Examiner*—Wayne Langel
(74) *Attorney, Agent, or Firm*—Wood, Phillips, Katz, Clark & Mortimer

(57) ABSTRACT

A method of producing hydroxylammonium salts by catalytic reaction of nitrogen monoxide with hydrogen in a diluted aqueous solution of mineral acid in the presence of platinum catalysts suspended on a support in multiple subsequent reaction stages. This reaction takes place in a stirred reactor wherein a gas inlet and distribution system is provided in the lower part of the stirred reactor, a disk agitator is placed immediately above, the hub with bearing surface or support mounting angled, concave and tilted agitator blades that rotate their angled or concave sides in the direction of motion, and a two-blade agitator is provided on the agitator shaft in the upper part of the stirred reactor, its individual leaves being offset like lamellas so that they constantly wet the reactor cap when rotating.

11 Claims, 3 Drawing Sheets

METHOD FOR PRODUCING HYDROXYLAMMONIUM SALTS

BACKGROUND OF THE INVENTION

1. Field of the Invention

The invention relates to a method of producing hydroxylammonium salts by catalytic reduction of nitrogen monoxide with hydrogen in a diluted aqueous solution of mineral acid in the presence of platinum catalysts suspended on a support in multiple subsequent reaction stages.

2. Background Art

Continuous production of hydroxylammonium salts by catalytic reduction of nitrogen monoxide with hydrogen in a diluted aqueous solution of mineral acid in the presence of suspended noble metal catalyst is a known method used at industrial scale and has been described in patent specification DE 1 177 118. According to this document, an aqueous solution of mineral acid that contains the suspended catalyst is typically conducted through multiple subsequent reaction stages (cascades), a mixture of nitrogen monoxide and hydrogen is introduced to each reaction stage, and the catalyst-containing hydroxylammonium salt solution is removed in the last reaction stage.

Although this method has proven its worth in principle, there is a need to increase the capacity of existing plants and to minimize the formation of undesired by-products such as dinitrogen monoxide, nitrogen and ammonia salts which reduce the yield of hydroxylammonium salt. A high concentration of dinitrogen monoxide also results in explosive mixtures. The formation of foam on the surface of the reaction mixture has an adverse effect in this context.

Accordingly, many studies aimed at improving the method have been conducted. Patent specification DE 2 736 906 B1 describes a method for producing hydroxylammonium salts in which an increased amount of platinum catalyst supported by graphite speeds up the reduction reaction so that the space-time yields of nitrogen monoxide is considerably higher (meaning higher throughput).

The disadvantage of this method is increased loss of platinum. In addition, the quantity of the catalyst cannot be increased indefinitely as this would jeopardize the required flow and filtering properties of the suspension.

Patent specification DE 3 713 733 describes a method for producing hydroxylammonium salts in which the formation of by-products is mainly suppressed by using supported platinum catalysts partially poisoned with sulfur and selenium, and in which the metallic platinum is precipitated from aqueous platinum solutions on supporting material using reducing agents in the presence of organic chelating agents.

The disadvantage of this method is that catalyst production becomes unjustifiably complicated.

Patent specification DE 3 130 305 A1 describes a method of producing hydroxylammonium salts in which the formation of foam on the surface of the reaction mixture is prevented or at least considerably suppressed by limiting the fine-grain portion of the supported platinum catalyst or by sprinkling the surface of the reaction mixture with reaction mixture and/or freshly supplied mineral acid or by adding foam-inhibiting compounds.

The disadvantage of this method is that a high fine-grain portion as compared to the threshold value forms relatively fast into the use life of the catalyst or that sprinkling the surface of the reaction mixture requires a relatively great technological effort. In addition, adding foam-inhibiting foreign substances often has to be ruled out for reasons of process stability and product quality in the subsequent processing of hydroxylammonium salts, e.g. when producing caprolactam.

The supply regime of mineral acid, for which various variants were developed, has played an important part in studies on capacity increase by means of a high reaction speed and increasing the selectivity of the conversion into hydroxylammonium salts, i.e. suppression of by-product formation.

Patent specification DE 3 107 702 describes a method of producing hydroxylammonium salts in which a defined pH value is set for the last reaction stage and in which the measured pH value controls the supply of fresh aqueous mineral acid to the first reaction stage. In this way, the formation of explosive exhaust gas mixtures or the increased formation of by-products in the last reaction stage is prevented.

Yet another method of producing hydroxylammonium sulfate described in patent specification DE 4 132 800 splits the supply of sulfur advantageously in such a way that diluted sulfuric acid is supplied to the first reaction stage and concentrated sulfuric acid is supplied to one or more of the subsequent stages while the content of free sulfuric acid is considerably decreased in the last reaction stage.

A similar method for producing hydroxylammonium salts is known from patent specification DE 10062325 according to which the supply of diluted aqueous solution of mineral acid is split into at least two partial streams while the supply is controlled using preferably the pH value of the last reaction stage to which the second partial supply stream is added.

The three patented methods relating to acid supply mentioned above are unsatisfactory despite their advantages because they make plant engineering more complicated and tend to impair process stability if the measured pH value is used as a control variable.

SUMMARY OF THE INVENTION

It was the technological object of this invention to provide a method for producing hydroxylammonium salts in which as high a reaction speed as possible is achieved in an uncomplicated manner and in which the disadvantages mentioned, especially those regarding safety, are prevented.

This object is achieved by a method for producing hydroxylammonium salts by reacting nitrogen monoxide (NO) with a molar hydrogen surplus in an aqueous medium of strong mineral acids in the presence of a noble metal catalyst suspended on a carbon-based support at excess pressure up to 10 bar and temperatures up to 80° C., the hydroxylammonium salt being constantly removed from the reaction vessel, said vessel being a stirred reactor with an agitator shaft and agitator blades attached to it via a hub and bearing surface or support, wherein, according to the invention

- a gas inlet and distribution system is provided in the lower part of the stirred reactor,
- a disk agitator is placed immediately above, the hub with bearing surface or support of which comprising angled, concave and tilted agitator blades that rotate their angled or concave sides in the direction of motion (i.e. their concave sides move against the liquid), and
- a two-blade blade agitator is provided on the agitator shaft in the upper part of the stirred reactor, its individual leaves being offset like lamellas at an angle of 0 to 30° C. to the blade axis so that they constantly wet the reactor cap when rotating.

Sulfuric acid is used for this reaction as the strong mineral acid to obtain hydroxylammonium sulfate. It is preferred for reactivity and corrosion reasons to use 4 to 5-normal aqueous sulfuric acid, the concentration of which declines across the reaction stages.

The reaction is performed while cooling the reaction medium to temperatures in the range from 30 to 80° C., particularly preferred to a range from 40 to 60° C.

The molar ratio at which hydrogen and nitrogen monoxide are typically used in each reaction stage is from 1.9 to 2.0:1.0.

The reaction is performed under increased pressure in the range from 1.0 to 10 bara, however good results are already obtained in the range from 3.0 to 5.0 bara.

Platinum is used as the catalyst for reducing the nitrogen monoxide, preferably applied to the graphite in quantities from 0.1 to 0.5 percent by weight which has a mean diameter in the range from 30 to 80 μm. This supported catalyst is used in the aqueous sulfuric acid in a fine suspension at concentrations from 7 to 50 g/l.

The reaction mixture that contains the suspended catalyst is removed from the last of the cascaded reaction stages; its hydroxylammonium sulfate content is 280 to 300 g/l (24 to 25.5 percent by weight).

An annular gas inlet and distribution system is used for the purpose.

The gas mixture consisting of nitrogen monoxide and hydrogen is introduced to the aqueous sulfuric acid that contains the platinum catalyst suspended on a support in the manner according to the invention, i.e. so that finely dispersed gas bubbles escape (mean gas bubble diameter 5 to 6 mm) from the annular gas inlet and distribution system at a rate of 7 to 30 m/sec. The gas beam disintegrates in the liquid into small bubbles with a great interphase boundary surface when it enters the flow field of the agitator that ideally is placed directly above the mixture; this provides the basis for improved mass transfer.

The modified disk agitator (FIG. 2) according to the invention at the bottom end of the special agitating device is characterized in that 6 concave blades having outwardly angled edges (half-pipes) are attached at an angle to the rotating disk, the individual blades having a relative width in relation to the agitator of 0.2 to 0.3 (b1:d2 in FIG. 1). The relative agitator diameter is in the range from 0.3 to 0.4 in relation to the reactor diameter (d2:d1 in FIG. 1).

Wall baffles are placed in the stirred reactor (FIG. 1) to achieve improved intermixing.

The two-blade blade agitator according to the invention (FIG. 3) in the top part of the special agitating device consists of multiple offset leaves set like lamellas at angles from 0 to 30° to the blade axis with a blade height from 0.2 to 0.5 in relation to the blade diameter (h4:d3 in FIG. 1) and a relative agitator diameter of 0.3 to 0.4 in relation to the reactor diameter (d3:d1 in FIG. 1).

The individual leaves are welded in lamellar orientation to the supporting or reinforcing ribs.

The special agitating device is operated according to the invention at a speed of 80 to 240 rpm. The peripheral speeds are in the range from 5 to 15 m/sec.

The stirred reactor to be used according to the invention with both agitators (FIG. 1) is schematically shown in FIGS. 1 to 3. This agitating device consists of a central cylindrical agitator shaft with a modified highly efficient disk agitator attached to its bottom end. Agitator blades domed against the direction of stirring having outwardly angled edges are attached to the rotating disk. The top portion of the agitator shaft is linked to a blade agitator consisting of multiple offset leaves with different angles of incidence.

Up to 6 baffles or wall baffles are installed to ensure a sufficient degree of reinforcement of the reactor. Internal and external cooling coils keep the process within the required temperatures.

BRIEF DESCRIPTION OF THE DRAWINGS

| FIG. 1 Stirred reactor | | | |
|---|---|---|---|
| 1. | Agitator shaft | d1 | Stirred reactor diameter |
| 2. | Disk agitator (bottom agitator) | d2 | Bottom agitator diameter |
| 3. | Blade agitator (top agitator) | d3 | Top agitator diameter |
| 4. | Inlet and distribution system | h1 | Reactor filling level |
| 5. | Wall baffle | h3 | Installation height of bottom agitator |
| 6. | Fitting for acid inlet | h4 | Blade height of top agitator |
| 7. | Fitting for product discharge | b1 | Blade width of bottom agitator |
| 8. | Exhaust gas outlet | | |
| 9. | Helical coil-type heat exchanger | | |
| 10. | Shell-type heat exchanger | | |

| FIG. 2 Disk agitator | |
|---|---|
| 1 | Agitator shaft |
| 11 | Agitator blades |
| 12 | Bearing surface |
| 13 | Agitator flange |

Figure 3:
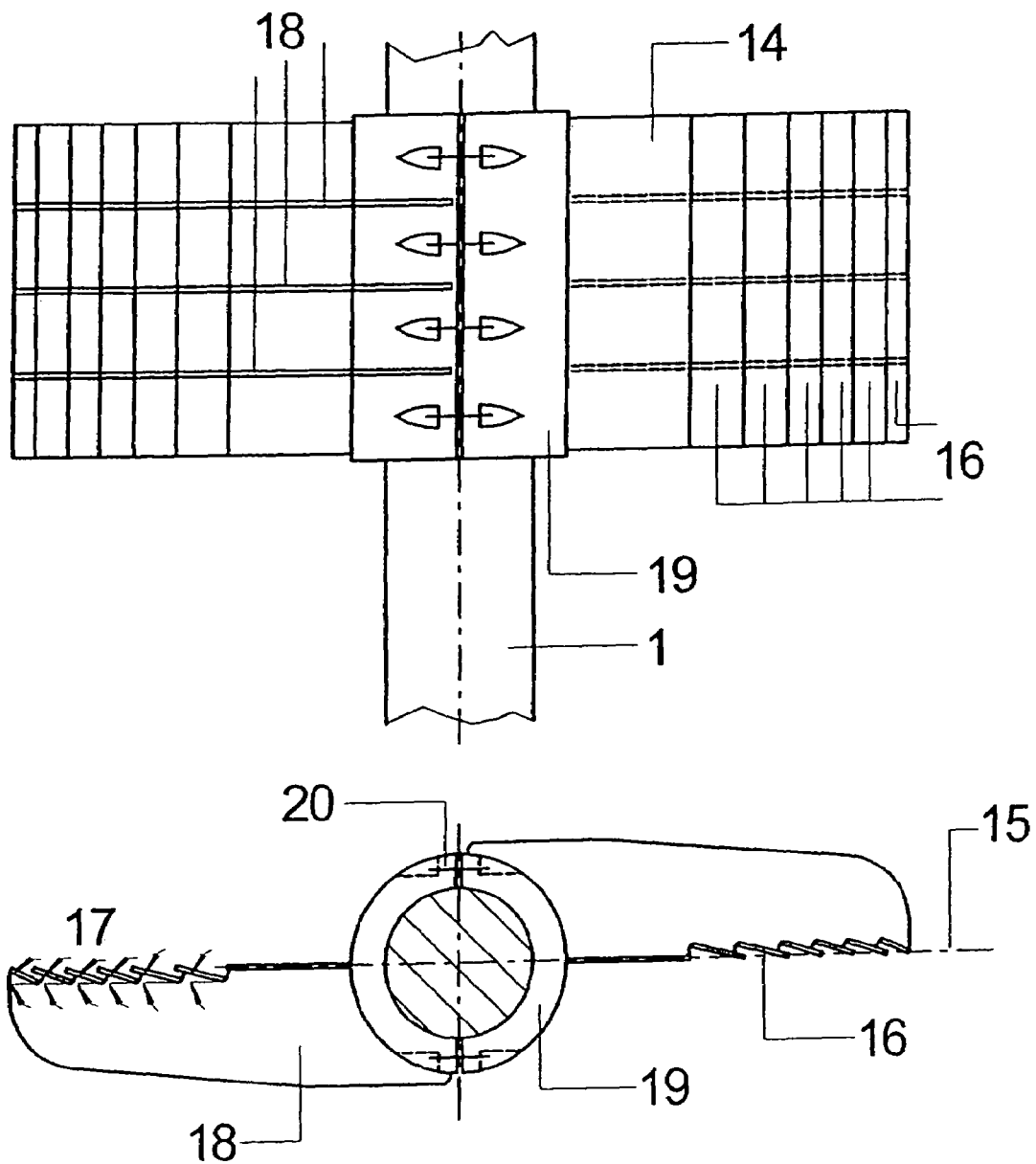

| FIG. 3 Blade agitator | |
|---|---|
| 1 | Agitator shaft |
| 14 | Blade |
| 15 | Blade axis |
| 16 | Individual blades |
| 17 | Angle between individual blades and blade axis |
| 18 | Supporting or reinforcing sheets |
| 19 | Clamping hub |
| 20 | Screwed connection |

FIG. 1

DETAILED DESCRIPTION OF THE DRAWINGS

Figure 1:
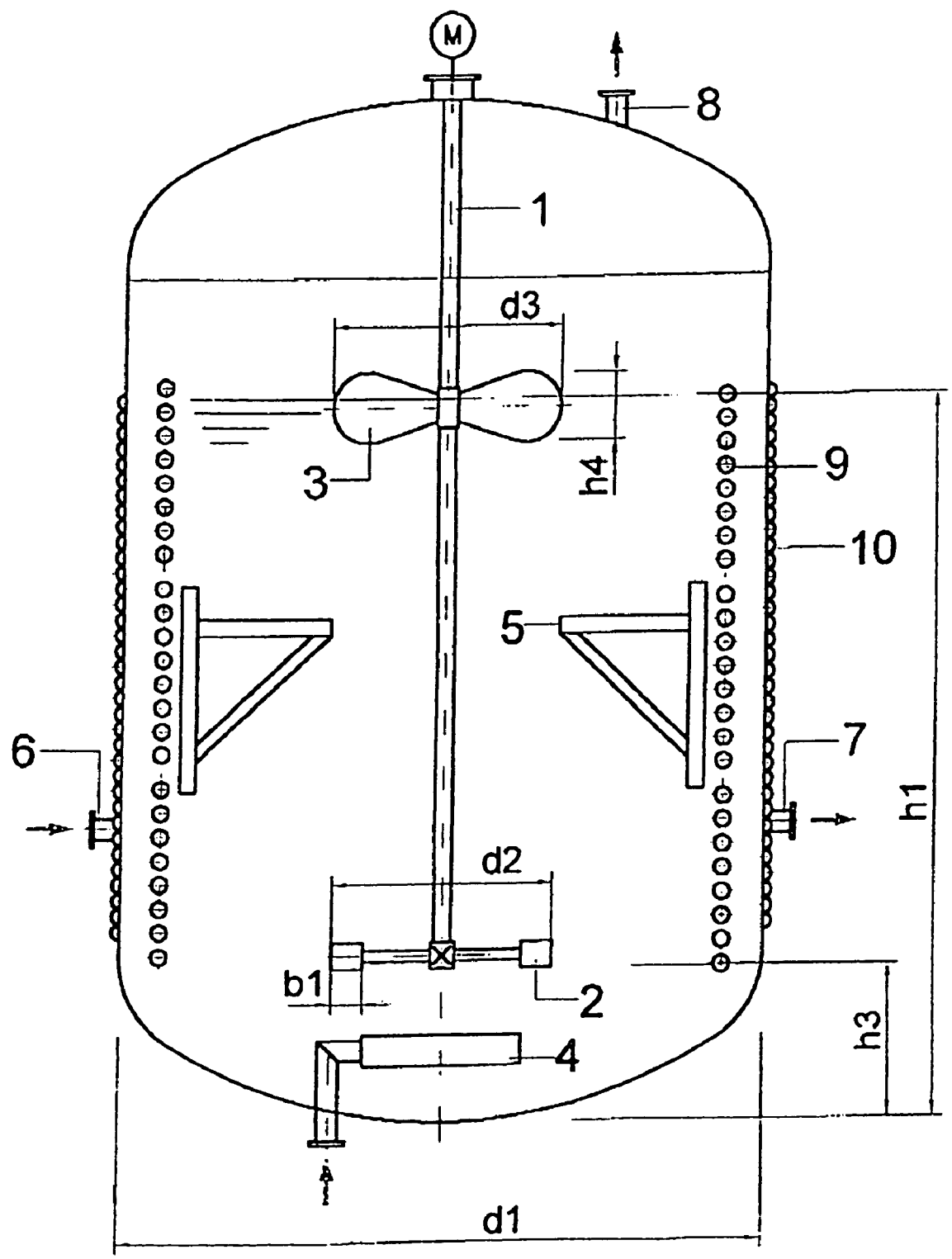

FIG. 1 shows the stirred reactor with its major components. The energy required for mixing the reactor contents is transmitted from the motor/gear unit via the agitator shaft (1) that is guided from the top. The local energy is input both at the disk agitator (2) and the blade agitator (3). The typical installation height h3:d1 is 0.19. 6 wall baffles (5) are used to prevent vortex formation and thus to ensure the required degree of reinforcement. Acid is supplied, and the product discharged, using fittings (6, 7) attached on the side at the bottom portion of the reactor. Gas is supplied using an external distribution system (4) to an area of high energy density to obtain bubbles as small as possible. The exhaust gas is discharged via an apparatus with a coalescer from the reactor cap, only outlined in the drawing (8).

3 independently fed helical coil-type heat exchangers (9) inside as well as a shell-type heat exchanger (10) with welded-on half-pipes outside of the reactor ensure the cooling of the exothermal process.

Figure 2:
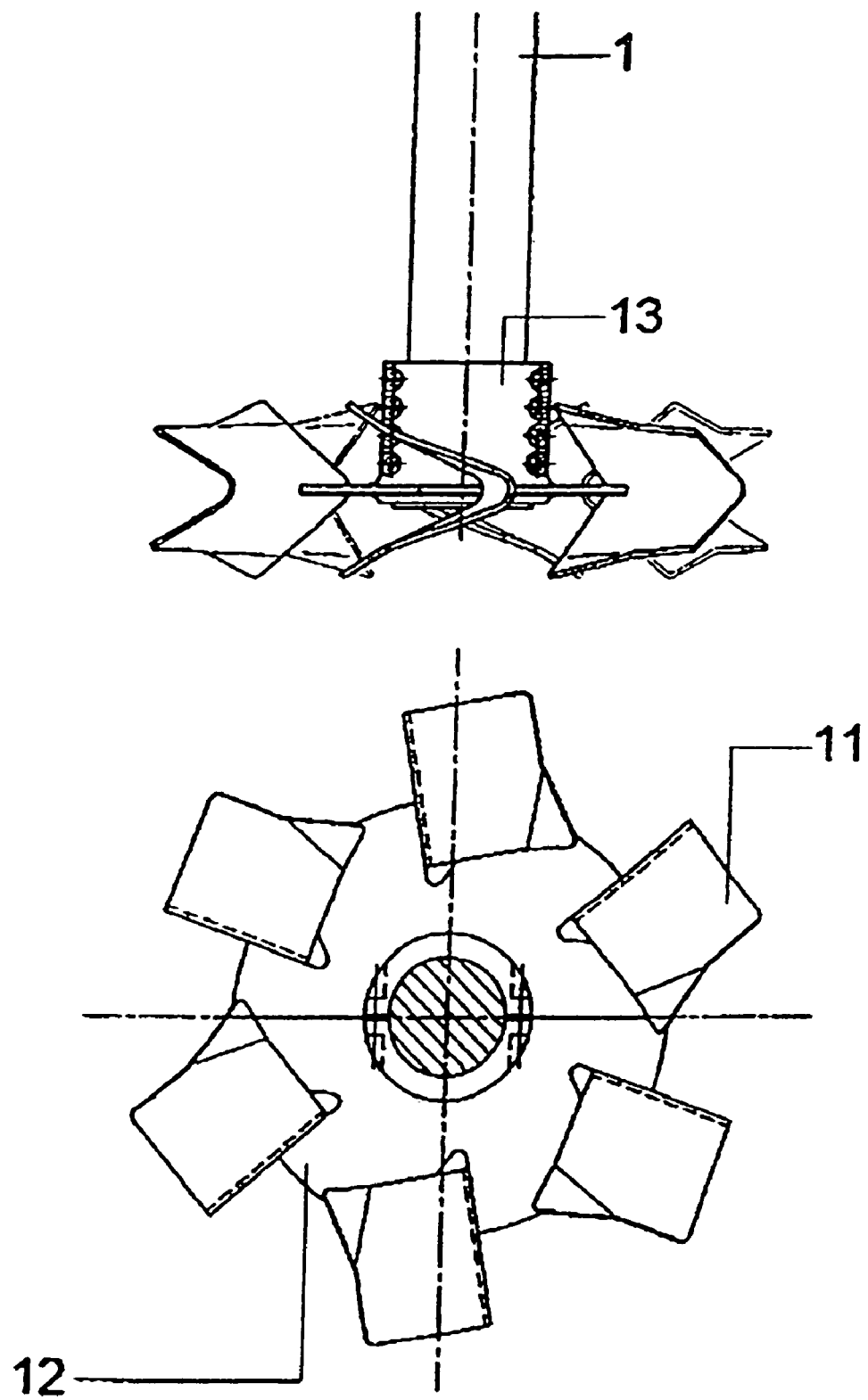

FIG. 2 (Top: Front View, Bottom: Top View)

The drawing shows the design of the 6-blade disk agitator used. The agitator blades or half-pipes (11) whose concave sides are bent against the direction of rotation are mounted on a bearing surface and have outwardly angled edges. The agitator flange 13 is screwed to the shaft (1) for individual adjustment of the installation height of the agitator.

FIG. 3 (Top: Front View, Bottom: Top View)

FIG. 3 shows the blade agitator used for wetting the reactor cap with liquid and preventing the formation of foam. It consists of two blades (14) arranged at an angle of incidence in relation to the liquid level between 45° and 90°, preferably 90°. Each blade consists of offset individual lamella-like leaves (16) that are tilted towards the blade axis (15) at angles (17) between 0° and 30°, preferably between 14° and 24°. Supporting or reinforcing sheets (18) are used to stabilize the design. Due to the design with screwed-on clamping hub (19, 20) the installation height on the shaft (1) can be adjusted individually.

Characteristic agitator dimensions are:

| Bottom agitator (disk agitator) | | |
|---|---|---|
| Relative blade width | b1/d2 | 0.23 |
| Relative agitator diameter | d2/d1 | 0.33 |
| Relative installation height | h3/d2 | 0.58 |
| Top agitator (blade agitator) | | |
| Relative blade height | h4/d3 | 0.34 |
| Relative agitator diameter | d3/d1 | 0.36 |

It is an advantage of the method according to the invention that the reduction reaction, due to the effect of the special agitating apparatus, surprisingly proceeds at an extraordinarily high rate, facilitating increased throughput without the need to enlarge the reaction chamber. This outcome specifically results from the special design of the modified disk agitator that is able to disperse the gas mixture consisting of nitrogen monoxide and hydrogen and introduced directly below the agitator from a gas inlet and distribution system extremely finely, as compared to other agitator types, in the aqueous sulfuric acid containing the platinum catalyst suspended on a support, to achieve complete gas distribution and high gas bubble recirculation. The resulting greatly improved mass transfer influences the processes that take place on the surface of the catalyst to an unexpectedly high degree.

The favorable reaction conditions caused by the disk agitator further result in considerable reduction of nitrogen monoxide content in the exhaust gas of the stirred reactors and contribute to an improved NO yield of the entire plant.

Another advantage of the special blade design of the modified disk agitator is that the effect of gassing on the power number is very small, allowing the agitator to achieve high mechanical stability against radial hydraulic forces. High mechanical stability facilitates high operational reliability and long running times due to reduced radial strain on the axial face seals used.

Compared directly to a classic disk agitator, this design allows the use of a greater agitator diameter, which improves gas dispersion at the same installed output.+

The advantageous result is also achieved due to the special blade agitator at the top portion of the agitator shaft as it easily ensures wetting of the reactor cap even if liquid levels in the reactor vary, which is imperative for reasons of operating safety (preventing the formation of dry catalyst nests due to catalyzing the reaction of NO with $H_2$ into $NH_3$) and product quality ($H_2$ corrosion of the steel). The special design of the agitator also effectively suppresses the formation of foam without sprinkling the surface or adding foreign substances.

As the driving force of the turnover drops due to the reaction equilibrium within the cascade of multiple reactors, especially the first reactors must be equipped with disk agitators designed according to the invention to reduce the reaction resistance caused by diffusion.

The hydroxylammonium sulfate obtained with the method according to the invention is suited for producing cyclohexanonoxime, a base material for producing caprolactam.

The following example is to illustrate the method according to the invention.

17 $m^3$/h of a 4.4-normal sulfuric acid are effectively added to the cascade consisting of 5 reactors (fluid volume 38 $m^3$). The agitator shaft speed is 160 $min^{-1}$. The NO—H2 mixture at approx. 32 vol.-% NO distributed in stages to the reactors converts at the catalyst into $NH_2OH$, $N_2O$, and $NH_3$. $NH_2OH$ and $NH_3$ are bound to sulfuric acid. The process takes place at 43° C. and an exhaust gas pressure of 3.3 bara until a residual sulfuric acid concentration of 0.2 to 0.4 n is reached. The final concentrations of hydroxylammonium sulfate and ammonium sulfate are in the range from 280 to 300 g/l and 7 to 20 g/l. The gas supply is controlled so that the NO content in the exhaust gas is 5 to 6 vol.-% and the $N_2O$ content is 4 to 5 vol.-%. HAS yields of 27 to 28 kg of HAS $m^3$ of reaction volume are reached with this configuration.

If two of the 5 reactors are equipped with modified gassing agitators of the type described, the NO portion in the exhaust of these reactors gas drops from 4.6 to 3.1 vol.-%. The improved NO turnover can be used to increase the effective acid supply to 18 $m^3$/h, corresponding to a yield of at least 29 kg HAS/$m^3$ reaction volume. The ammonium sulfate content remains low without any change.

The invention claimed is:

1. A method for producing hydroxylammonium salts by reacting nitrogen monoxide (NO) with a molar hydrogen surplus in a reaction vessel in an aqueous medium of strong mineral acids in the presence of a noble metal catalyst suspended on a carbon-based support at excess pressure up to 10 bar and temperatures up to 80° C., the hydroxylammonium salt being constantly removed from the reaction vessel, said reaction vessel being a stirred reactor with an agitator shaft and agitator blades attached to the agitator shaft via a hub and bearing surface or support, characterized in that:

a gas inlet and distribution system is provided in a lower part of the stirred reactor, a disk agitator is placed immediately above the gas inlet and distribution system, the disk agitator comprising the hub, said hub comprising the bearing surface or support with angled, concave and tilted agitator blades that rotate angled and concave sides in a direction of motion, and a two-blade blade agitator is provided on the agitator shaft in an upper part of the stirred reactor, individual leaves of the blade agitator being offset like lamellas at an angle of 0 to 30° C. to a blade axis so that they constantly wet a reactor cap when rotating.

2. The method according to claim 1 wherein sulfuric acid at a 4 to 5-normal concentration is used as the strong mineral acid and the product is hydroxylammonium sulfate.

3. The method for producing hydroxylammonium salts according to claim 1 wherein hydrogen and NO are used at a molar ratio of 1.9 to 2.0: 1.0.

4. The method for producing hydroxylammonium salts according to claim 1 wherein the suspended catalyst (including its support) is used in a liquid suspension at 7 to 50 g/l and a mean diameter of 30 to 80 pm.

5. The method for producing hydroxylammonium salts according to claim 1 wherein platinum is used as a noble metal catalyst at a concentration of 0.1 to 0.5 percent by weight in relation to its carbon support.

6. The method for producing hydroxylammonium salts according to claim 1 wherein gases escape from an annular gas inlet and distribution system with an average gas bubble diameter of 5 mm to 6 mm and a gas speed of 7 to 30 m/sec.

7. The method for producing hydroxylammonium salts according to claim 1 wherein 6 concave and tilted agitator blades are attached to the rotating hub of the disk agitator.

8. The method for producing hydroxylammonium salts according to claim 1 wherein wall baffles are arranged in the stirred reactor.

9. The method for producing according to claim 1 wherein the two-blade blade agitator in the top portion of the stirred reactor is placed at an angle of incidence of 45° to 90° in relation to a liquid level in the reactor, wherein the blade agitator consists of offset individual lamella-like leaves, and wherein the blade agitator diameter is 0.3 to 0.4 relative to the reactor diameter.

10. The method for producing hydroxylammonium salts according to claim 1 wherein a blade height of the individual leaves of the blade agitator is 0.2 to 0.5 relative to a diameter of the blade agitator.

11. The method for producing hydroxylammonium salts according to claim 1 wherein the disk agitator in the bottom portion of the reactor is operated at a peripheral speed of 5 to 15 m/sec.

* * * * *

UNITED STATES PATENT AND TRADEMARK OFFICE
CERTIFICATE OF CORRECTION

PATENT NO. : 7,608,236 B2
APPLICATION NO. : 10/562984
DATED : October 27, 2009
INVENTOR(S) : Löbel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this

Twelfth Day of October, 2010

David J. Kappos
*Director of the United States Patent and Trademark Office*